W. PATTERSON.
SPRINKLING ATTACHMENT FOR AUTOMOBILES.
APPLICATION FILED DEC. 12, 1914.

1,177,799.

Patented Apr. 4, 1916.

Witnesses
C. Peinle, Jr.
J. W. Garner

Inventor,
William Patterson
By Victor J. Evans,
Attorney.

UNITED STATES PATENT OFFICE.

WILLIAM PATTERSON, OF STROUDSBURG, PENNSYLVANIA.

SPRINKLING ATTACHMENT FOR AUTOMOBILES.

1,177,799.  Specification of Letters Patent.  Patented Apr. 4, 1916.

Application filed December 12, 1914. Serial No. 876,941.

*To all whom it may concern:*

Be it known that I, WILLIAM PATTERSON, a citizen of the United States, residing at Stroudsburg, in the county of Monroe and State of Pennsylvania, have invented new and useful Improvements in Sprinkling Attachments for Automobiles, of which the following is a specification.

This invention is an improved apparatus for attachment to and used in connection with an automobile for sprinkling roads with water, oil or other liquid substances for laying the dust or maintaining the road and for other like purposes, the object of the invention being to provide an improved sprinkling apparatus of this kind which may be readily attached to any ordinary automobile and readily operated by the driver of the automobile.

The invention consists in the construction, combination and arrangement of devices hereinafter described and claimed.

Figure 1:
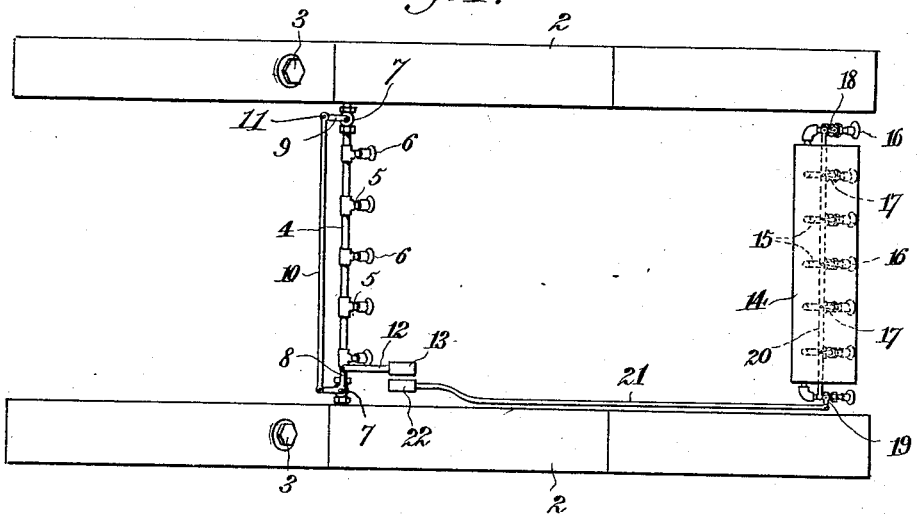
Figure 2:
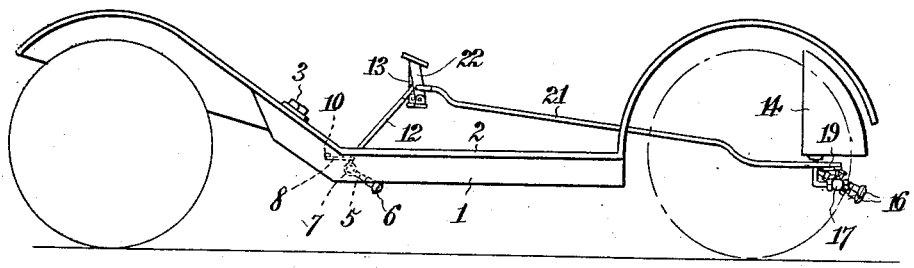
Figure 3:
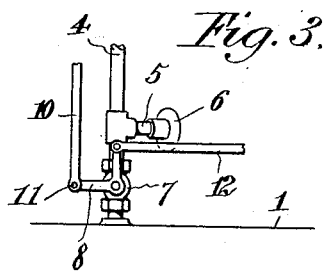
Figure 4:
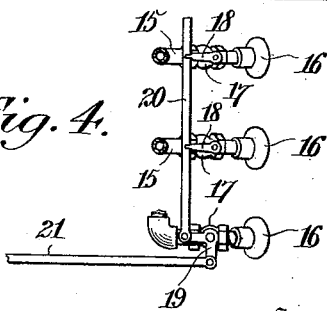

In the accompanying drawings:—Figure 1 is a plan of an automobile provided with a sprinkling attachment constructed in accordance with my invention, the automobile illustrated diagrammatically and the body being removed. Fig. 2 is a side elevation of the same. Figs. 3—4 are detail views.

In accordance with my invention I provide side tanks 1 which are arranged along the under sides of and secured to the automobile running boards 2. Each tank is here shown as provided with a suitable filling cap 3. A pipe 4 which is arranged transversely under the automobile body connects the tanks 1 and is provided with arms 5 each of which has a sprinkling rose or nozzle 6. The pipe is also provided with valves 7 to control the flow of liquid therethrough from the said tanks and enable the same to be cut off when desired and these valves which are of the turning plug variety are provided, at one end with a bell crank 8 and the other with a lever arm 9. A rod 10 connects the lever arms with one arm of the bell crank, the said rod being pivotally connected at its ends as at 11 to said lever arm and said arm of the bell crank. The other arm of the bell crank is connected by a rod 12 to a treadle lever 13 which is arranged vertically and extends up from the bottom of the automobile body where it may be readily reached by the driver. I also provide a rear tank 14 which is arranged between the rear wheel guards. This tank is provided on its under side and at its ends with discharge tubular arms 15, which, like those of the pipe 4 are detachable and rearwardly directed and each of which is provided with a sprinkling rose or nozzle 16 and also with a controlling valve 17 of turning plug variety. The turning plugs excepting one are all provided with lever arms 18 the remaining plug valve at one end of the tank having a bell crank 19. The arms 18 are connected together and to one arm of said bell crank 19 by the rod 20 for operation in unison, and to the other arm of said bell crank is attached a rod 21 the front end of which is attached to a treadle lever 22 which is similar to the treadle lever 12 and is arranged by the side thereof so that the driver with one foot can if he desires, operate both of the treadle levers simultaneously to cause them to open or close the valves of the tank or if he wishes to use the side tanks without the rear tank or the rear tank without the side tanks, he can operate only the appropriate treadle lever.

It will be understood that by means of my improved sprinkling attachment an automobile vehicle can be used for sprinkling water, oil or other suitable liquid on a roadway to lay the dust or maintain the road and that the same can be readily operated and controlled.

Having thus described my invention, I claim:—

A vehicle of the class described formed with running boards, tanks located under the respective boards and disposed in spaced parallel relation to each other and provided with a connecting discharge pipe, said discharge pipe having discharge nozzles and being also provided with turning plug valves to control the discharge of liquid from the respective tanks, a second tank disposed transversely of the vehicle at one end thereof and being also provided with turning plug valves to control the discharge of liquid therefrom, and means connected with the turning plugs of each tank for causing an independent or simultaneous discharge of the liquid from said tanks.

In testimony whereof I affix my signature in presence of two witnesses.

WILLIAM PATTERSON.

Witnesses:
WILLIAM A. SHAFER,
WILLIAM F. SMARTWOOD.

Copies of this patent may be obtained for five cents each, by addressing the "Commissioner of Patents, Washington, D. C."